United States Patent [19]

Szaplonczay et al.

[11] Patent Number: 4,897,027
[45] Date of Patent: Jan. 30, 1990

[54] APPARATUS FOR PRODUCING HIGH-VOLTAGE INSULATORS RESISTING DAMAGE BY BIRDS

[75] Inventors: Pál Szaplonczay, Budapest; Zsuzsanna Sényei, Solymár; Alajos Bognár, Budapest; Márton Téglás, Budapest; László Csabai, Budapest, all of Hungary

[73] Assignee: Villamosipari Kutato Intezet, Hungary

[21] Appl. No.: 177,862

[22] Filed: Mar. 24, 1988

Related U.S. Application Data

[62] Division of Ser. No. 859,638, May 5, 1986, abandoned.

[30] Foreign Application Priority Data

May 17, 1985 [HU] Hungary .................................. 1856/85

[51] Int. Cl.⁴ ........................ B29C 54/14; B29C 45/18
[52] U.S. Cl. .................................... 425/117; 425/120; 425/129.1; 425/200; 425/584
[58] Field of Search .................. 174/179, 143; 264/28, 264/272.11, 257, 258, 272.13, 328.4, 328.6; 425/200, 204, 206, 557, 559, 585, 560, 584, 117, 120, 129.1

[56] References Cited

U.S. PATENT DOCUMENTS

| | | | |
|---|---|---|---|
| 1,776,366 | 9/1930 | Novotny | 264/28 |
| 2,837,768 | 6/1958 | Talalay | 264/28 |
| 2,862,239 | 12/1958 | Pollard et al. | 425/200 |
| 3,130,102 | 4/1964 | Watson et al. | 264/28 X |
| 3,170,968 | 2/1965 | Rokunohe et al. | 264/279 X |
| 3,490,731 | 1/1970 | Bradley | 174/143 |
| 4,217,466 | 8/1980 | Kuhl | 174/179 |
| 4,243,628 | 1/1981 | Herold | 264/279 X |
| 4,373,113 | 2/1983 | Winkler et al. | 174/179 |
| 4,442,060 | 4/1984 | Bouverot et al. | 264/328.2 |
| 4,604,498 | 8/1986 | Kuhl | 174/179 X |

FOREIGN PATENT DOCUMENTS

| | | | |
|---|---|---|---|
| 2140835 | 3/1973 | Fed. Rep. of Germany | 29/631 |
| 2425076 | 11/1975 | Fed. Rep. of Germany | 174/179 |
| 2828375 | 12/1979 | Fed. Rep. of Germany | 174/179 |
| 2500370 | 8/1982 | France | 264/279 |
| 53-3775 | 2/1978 | Japan | 264/328.2 |
| 6813405 | 3/1970 | Netherlands | 264/328.2 |
| 915052 | 1/1963 | United Kingdom | 174/176 |
| 1006037 | 9/1965 | United Kingdom | 264/28 |
| 1601379 | 10/1981 | United Kingdom | 174/179 |

Primary Examiner—Willard Hoag
Attorney, Agent, or Firm—Handal & Morofsky

[57] ABSTRACT

High voltage insulator is produced by inserting a fiber reinforced core into the mold and filling the mold from the bottom through a casting pipe line attached to a tank for a ready to use liquid silicon rubber mixture, and transferred to the heated mold where crosslinking of the mixture occurs.

5 Claims, 2 Drawing Sheets

APPARATUS FOR PRODUCING HIGH-VOLTAGE INSULATORS RESISTING DAMAGE BY BIRDS

This application is a division of application Ser. No. 859,638, filed May 5, 1986 and now abandoned.

FIELD AND BACKGROUND OF THE INVENTION

The present invention relates to a method for producing a silicone elastomer based insulating materials containing additives of max. 55 percent by weight, particularly resistant to damages done by birds, and suitable for being applied to medium-and high-voltage outdoor insulators. The invention relates, further, to a method and equipment for manufacturing outdoor insulators having fibre-reinforced cores provided with sheds for increasing the creepage distance (leakage path) along the insulator surface.

It is known that a high-voltage insulator body of solid silicone rubber attaining its cross-linked (referred to as HTV) high temperature vulcanized (in the following) structure, at elevated temperatures can only be produced in several steps, as stated, e.g., in West-German Patent of Rosenthal Technic AG. In the manufacturing process specified in this patent, first, a HTV silicone rubber layer is extruded over a glass-fibre-reinforced rod carrying the mechanical load and, then, cured. In the second step, the insulator sheds of required size are produced, one after the other, also cured from HTV silicone, by the traditional pressing process commonly used in rubber industry, then, as third step, the sheds thus obtained are pushed over the already coated rod and bonded to it with a special adhesive.

The method described also confirms that insulator bodies of complex shape and large size cannot be produced from HTV silicone rubber by conventional pressing technology. This is due to the fact that for the continuity of insulator material (i.e.) its freedom from blisters, demanded from the point of view of the electric power industry, extremely high specific extruding pressure and, correspondingly, specially shaped tools and extruding equipment are required. Beyond all this, in the course of extrusion, the mechanically loaded glass-fibre reinforced core (generally, having the shape of a rod or tube) tends to suffer cracks, destructions or deformations. In addition, the method proposed by the West-German Patent is rather labor- and energy-intensive, due to its customary characteristics. Another problem lies in the mechanically and electrically weak points developing on the bonded surfaces of silicone rubber components. Consequently, no economical way of producing such insulator bodies has been found yet. Neither the so-called liquid silicone rubber (LSR) suitable for being processed by injection moulding has brought about any revolutionary changes in the production of such insulating bodies, since its appearance during the second half of the 70's. The reason lies partly in the difficulty associated with the extraordinarily high tool-closing forces required in the production of bulky or larger-size bodies, the processing technology being akin to that used in processing thermoplastics. Consequently, the LSR-type materials have found their application in the production of small-size technical and sanitary articles (O-rings, vial stoppers, soothers and teats, etc.) Moreover, the worm feeder type moulding machines, having become wide-spread in the meantime are not suitable for blister-free, safe manufacture of larger-size products.

In British Pat. No. 1292 278 a composite insulator is described in which a glass-fibre-reinforced rod for taking up mechanical loads is located concentrically and the surface of which is coated with a material resisting to creepage currents, and over which prefabricated sheds, shrinking under the effect of heat, are pushed. The sheds are then glued to the rod by means of a coating made of a heat-melted compound. A great disadvantage of the method proposed by the British patent is the shrinkage of the structural material under the effect of heat. This is due to the very low shrinkage stress of compounds partially mouldable as thermoplastic materials, this shrinkage stress being so low that practically no compressive force develops between the mantle of the supporting rod and the shed pushed over it, whereby small voids and cracks remain in the filling material of interstices in which the water entering by diffusion tends to condense, leading to electric breakdowns. All this applies also to the coating of the rod consisting of the same material and fixed in the same way as the shed.

Another method has been described in a West-German Laid-Open Application No. 22 54 468, where the mutually overlapping sheds are made of butyl rubber and are fixed in the longitudinal axis of the concentrically arranged supporting rod. The sheds are prefabricated and pushed over said supporting rod to which silicone grease is applied previously. The deficiency of this type lies in the poor resistance of butyl rubber to oxidation in outdoor applications, resulting in an insufficient leakage resistance. Neither the proposed silicone grease as intermediate layer exhibits an acceptable resistance to conditions prevailing outdoors. In the electric field built up across the butyl rubber, the silicone grease suffers chemical decomposition, in the course of which conductive components are formed, resulting in electric breakdown between the sheds and supporting rod.

When examining the insulation proposed by the present invention, the following can be stated concerning the composition of the liquid silicone elastomer with its cross-linked structure developing according to the addition mechanism well-known from literature (e.g. see U.S. specifications of Nos. 3,697,473, 3,884,866, 4,162,243 and 4,427,801), the components are as follows:

within the triorgano-siloxy terminal group a poly-diorgano siloxane containing a vinyl group, termed in some cases also as vinyl-functional polysiloxane;

organohydrogen-siloxane compounds (H-functional polysiloxane);

a platinum-containing catalyst, further, in some cases, an inhibitor, a pigment and a filler.

The reaction bringing about the cross-linking structure and the addition of loose H of organo-hydrogen-siloxane to the vinyl-group of the poly-disorganosiloxane, which is catalyzed, as commonly known, by compounds of platinum.

The characteristic properties of products made of liquid silicone rubber are rather modest as compared to traditional solid silicone rubbers attaining their cross-linked structure in hot state by means of a peroxide treatment or by way of addition (:J. Karger-Kocsis: Müszaki Gazdasági Tájékoztató25, 1565 (1984):) by introducing, as filler, colloidal silicic acid, surface-treated ("silylized") by silyle compounds (see, e.g. U.S. Pat. No. 3,122,516 and West-German Patent No. 2953

252) or by suitably selecting the quality of vinyl-functional polysiloxane (U.S. Pat. Nos. 3,671,480 and 3,697,473) and West-German Patent No. 2918313) or possibly, by combining the two compounds U.S. Pat. 4,427,801 and West-German Patent 2,918,313).

Liquid silicone rubbers have not been used for manufacturing electric insulators, because on the one hand, no satisfactory results have been achieved so far in producing such large-size bodies from these materials on the other hand, the damage done by birds could not be avoided even with types of increased spalling resistance.

Any improvement of physico-mechanical characteristics of liquid silicone rubbers could be achieved almost exclusively by the use of colloidal silicic acid (pyrogenic $SiO_2$) in its surface-treated form. However, this would increases further the anyway relatively high viscosity ($5 \times 10^5$ to $1 \times 10^6$ mPas) of liquid silicone rubber, making its processing into larger-size bodies impossible. According to relevant specifications, insulators may be made of relatively soft (40 to 60 Shore A) silicone rubber, yet their reliable service is often jeopardized by birds—mainly by crows—chipping off pieces from the insulators, and this cannot be prevented by increasing the spalling resistance. Thus, it is not a mere chance that the traditional material of outdoor electric insulators is epoxy resin. Although the process for preparing epoxy-modified silicones is known from literature (e.g. No. 4,394,013 U.S. patent) yet, due to the complexity of their manufacture, they have not gained ground in that field of application.

Among the requirements to be fulfilled by the material of insulators that of reduced combustibility often appears. In the case of silicone elastomers, for this purpose, various metallic compounds, as MgO (West-German Patent 308608 ZnO and MgO West-German Patent 2257915) and, in addition to the former, aluminium- and tin-oxides (West-German Patent 2308595) cerium salts (U.S. Pat. Nos. 3,264,382 and 3,884,950, as well as U.K. Pat. No. 1,299,687, titanium oxide and iron oxide West-German patent 2617434, platinum compounds (West-German patent 2,849,228) or, possibly, a mixture of organic bromine compounds and fillers are applied. The use of the above compounds in the case of silicone rubbers containing an addition-type cross-linked platinum catalyser may be hazardous, since by many of the enumerated compounds the platinum catalyser is contaminated and inactivated, impeding the process of curing (West-German patent 2849228, p. 3, lines 24 to 34).

According to the present state of the art, no method is known by which, without considerably influencing the viscosity (curing) of liquid silicone rubber, the possibility could be opened toward the production of insulators protected against the damaging effects done by birds and, at the same time, possessing the required property of incombustibility.

SUMMARY AND OBJECTS OF THE INVENTION

We have set the aim to be achieved by the present invention to develop an insulating material exhibiting good resistance to the damage done by birds and even after having damage done by birds retaining at the same time, good insulating properties and lending itself to be produced with high productivity. A further aim of the present invention is to develop an equipment accomplishing the method proposed.

The set aim is achieved, according to the invention, by means of the method detailed in the introduction by adding to the silicone elastomer mixture 5 to 55 percent by weight aluminium trihydrate, and mixing to the liquid silicone elastomer a feldspathoid aluminium silicate containing some sulfur in quantities of 0.1 to 10, expediently 0.5 to 5, preferably 1 to 2 percent by weight, then producing in that mixture a cross-linked structure by applying a heat treatment known in itself. The advantage of the insulating material obtained by this method is its good resistance to the damage done by birds, when applied in outdoor insulators, by having recognized the fact that feldspathoids with sulfur content responsible for the resistance to the damage done by birds do not inactivate the platinum catalyser serving for bringing about the cross-linked structure of silicone rubber.

It has also been recognized that these materials do not reduce the electric breakdown strength and the creepage strength of electric insulators.

According to an advantageous way of producing an insulating material complying with the invention, ultramarine, cancrimite and nosean have been used as feldspathoids, feldspathoid aluminium silicates having been found to be excellent for accomplishing the set aim.

The method for producing outdoor insulators complying with the invention is characterized by filling the silicone elastomer mixture in liquid state at room temperature into a tank, then, by producing overpressure in said tank, said mixture is led into a mould already containing the core material 12. The process of producing the cross-linked structure of the silicone elastomer mixture takes place in the mould. The advantage of this method lies in the possibility of filling larger amounts of insulating material, at a time into the tank, so that several contiguous insulator sheds can be obtained in one operation. A further advantage of this method is that after taking apart the mould, no post-heat treatment of the insulators is required.

In order to avoid the inclusion of blisters in the body of insulators produced by this method, the mixture is to be filled into the tank through its bottom.

To prevent solidification of silicone elastomer into the structural parts containing the elastomer mixture, before and after the period of casting, according to the invention, said parts are to be cooled at least to $-5°$ C.

To ensure proper filling of the mould by the silicone elastomer mixture avoiding the inclusion of blisters, in the course of producing insulators in compliance with the invention, at room temperature the dynamic viscosity of the elastomer mixture in itself, or by adding a diluting agent of max. 5 percent by weight shall be below $3 \times 10^5$ mPas. As diluting agent it is expedient to use a silicone oil and/or a cyclical siloxane compound of $10^2$ to $10^3$ mPas dynamic viscosity.

The equipment realizing the method proposed by, and also specific to, the invention is characterized by a detachable pouring head connected to the outlet of the unit dosing and mixing the components of the insulating material, said pouring head being connected into the tank through a pipeline, further, on the mould corresponding to the shape of the insulator body an adapter is formed to which the pouring head is attached. Advantages of this equipment are as follows: easy handling resulting from its simple construction, bubble-free delivery and processing of material ensured by the adoption of a closed system. It is a very favourable feature that, at the end of the work, there is no need to disassemble and rinse out the equipment with a solvent, as it is necessary in the case of known equipment processing catalyzing resins.

In order to ensure the filling up of the mould with the insulating material without introducing bubbles or blisters, the adapter mentioned above is located at the bottom of the tank.

The mould 8 is expediently split along its vertical longitudinal axis, and it is openable. A hydraulically operated opening-closing mechanism is coupled with the two split halves.

In the preferred embodiment of the equipment complying with the invention the pipe line is connected into the tank from below. At the top of the tank a pipe stub suitable for the admission of compressed air is connected. By means of this constructional arrangement, the liquid silicone elastomer compound of extraordinarily high dynamic viscosity (in the order of magnitude of $10^5$ mPas) can successfully be forwarded by compressed air. So far, for this purpose gear pumps and piston pumps have exclusively been used. In spite of using compressed air for forwarding the silicone elastomer into the mould, we have succeeded in producing blister-free products, said property being of utmost importance in the case of electric products.

In a further advantageous embodiment of the manufacturing equipment complying with the invention the component parts containing the silicon elastomer mixture in still liquid state are surrounded by a jacket in which a cooling medium is circulated. Thereby it can be ensured that, in the periods preceding and following the process of casting, constructional component parts can be cooled to at least $-5°$ C. by circulating the coolant.

EXAMPLE 1

Figure 1:
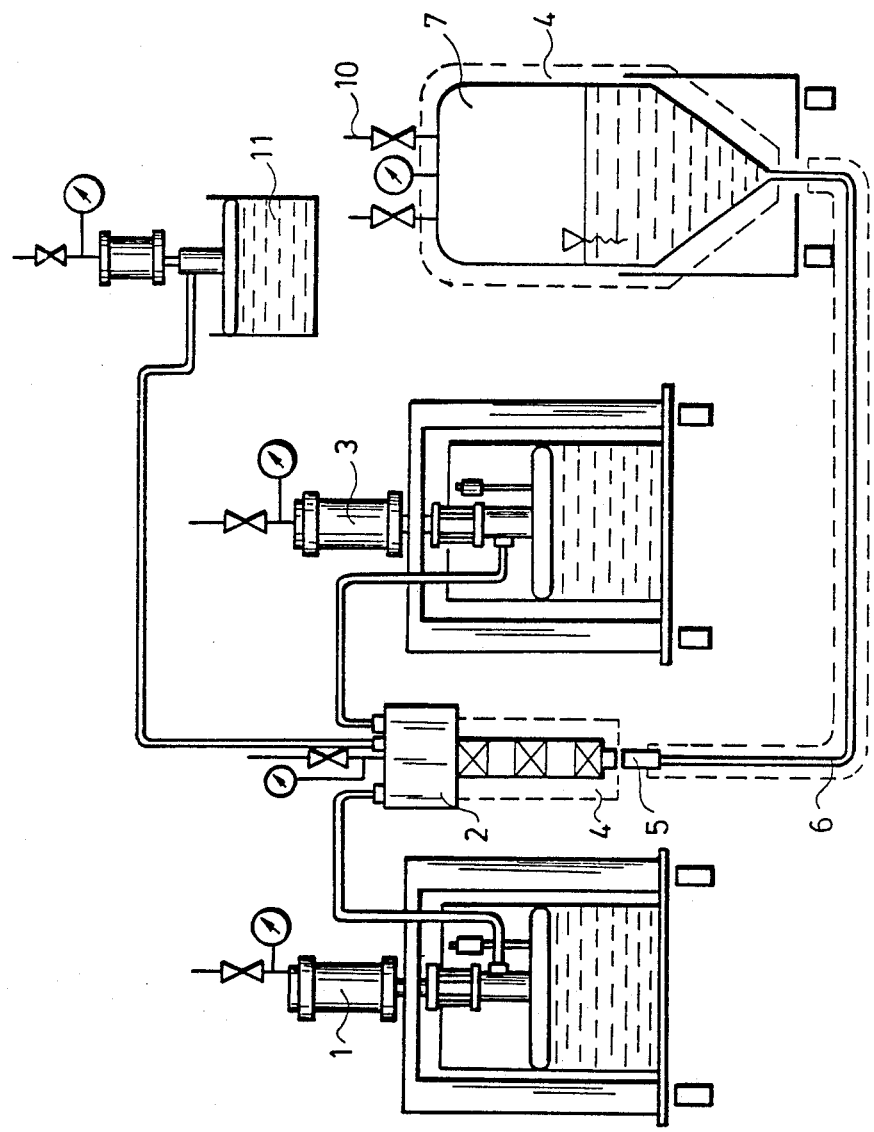
FIG. 1 is the simplified drawing of the two-component silicone feeding and mixing equipment connected with the pressure tank.

50 percent by weight ultramarine dispersed in 1:1 mixture of hexamethyl-cyclo-trisiloxane and methyl-cyclo-tetrasiloxene of 0.2 percent by weight 49.9 weight percent by vinyl-functional polysiloxane of $7 \times 10^4$ on as dynamic viscosity and 49.9 percent by weight hydrogen-functional polysiloxane of $7 \times 10^5$ mPas dynamic viscosity are blended in a static mixer, in a closed system, at room temperature.

This mixture has a dynamic viscosity of $1 \times 10^5$ mPas. The mixture is fed into a mould heated to 120° C., where it acquires a cross-linked structure under a pressure of 5 bar. After 15 minutes required by the cross-linked structure to develop, the finished insulator is removed from the mould.

Insulator bodies produced by the above method were found to have suffered no damage attributable to birds, after a 3-year period of outdoor service.

EXAMPLE 2

Under the conditions described in Example 1 a mixture containing 50 percent by weight vinyl-functional polysiloxane of $7 \times 10^4$ mPas dynamic viscosity, 50 percent by weight hydrogen-functional polysiloxane of $1 \times 10^5$ mPas dynamic viscosity has been prepared. The dynamic viscosity of this mixture is also $1 \times 10^5$ mPas. We have found that the insulator body containing no feldspathoid additives has suffered a breakdown after a few months of service, and detailed examination has shown that the creepage strength of these insulators has been impaired, under heavily polluted industrial surroundings, mainly in consequence of damages done by crows.

EXAMPLE 3

To 41 percent by weight vinyl-functional polysiloxane of $1 \times 10^6$ mPas dynamic viscosity, first, 1 percent by weight nosean has been mixed, then, to this mixture 40 percent by weight hydrogen-functional polysiloxane of $2 \times 10^6$ mPas dynamic viscosity and 58 percent by weight ultramarine dispersed in 1:1 mixture of altogether 18 percent by weight hexamethyl-cyclo-trisiloxane and methyl-cyclo-tretrasiloxane has been added. The dynamic viscosity of this mixture is $8 \times 10^4$ mPas. This considerable increase of viscosity is to be attributed to the ultramarine added in a quantity of 18 percent by weight, and it has been found that even at an applied pressure as high as 10 bar we have not succeeded in producing blister-free insulators.

Thus there is no use of adding ultramarine to the mixture in such a high dosage.

EXAMPLE 4

First, to 38 percent by weight vinyl-functional polysiloxane of $7 \times 10^4$ mPas dynamic viscosity 0–5 percent by weight cancrinite and 0.5 percent by weight nosean is mixed, then, to this mixture 38 percent by weight hyrogen-functional polysiloxane of $1 \times 10^5$ mPas dynamic viscosity is added. As further additive, 21 percent by weight aluminium-trihydrate is added to the mixture. The dynamic viscosity of the mixture thus obtained is $3 \times 10^5$ mPas. Outdoor testing of isolators thus produced has shown that by the addition of aluminium-trihydrate as filler the resistance to electric erosion and to combustion have considerably increased and, beyond that, no damage attributable to birds has been found on the insulators after a 3-year period of outdoor service.

EXAMPLE 5

To the mixture made up of 40 percent by weight vinyl-functional polysiloxane of $1 \times 10^5$ dynamic viscosity containing 25 percent by weight calcium carbonate and of 40 percent by weight hydrogen-functional polysiloxane of $1 \times 10^5$ mPas dynamic viscosity also containing 25 percent by weight calcium carbonate, an amount of 50 percent by weight ultramarine dispersed in a 1:1 mixture of 10 percent by weight hexamethyl-cyclo-trisiloxane and methyl-cyclo-tetrasiloxane is added, together with 5 percent by weight colloidal silicic acid and 5 weight percent ground quartz. Te dynamic viscosity of the mixture thus obtained is $2.5 \times 10^5$ mPas. It can be seen that by adding 10 percent by weight ultramarine the viscosity figure may though be improved, exhibiting thus a good resistance to the damage done by birds, yet the resistance of such insulators to electric erosion and combustion lag behind those of the composition mentioned in Example 4.

EXAMPLE 6

To 20 percent by weight vinyl-functional polysiloxane of $7 \times 10^4$ mPas dynamic viscosity 10 percent by weight cancrinite is admixed, then to this mixture 20 percent by weight hydrogen-functional polysiloxane and as additive, 50 percent by weight ground quartz powder is added. The dynamic viscosity of this mixture is $2\times 10^6$ mPas. It can be seen that, due to the high ground quartz content, the dynamic viscosity has considerably increased, therefore this material is no more suitable for casting insulators, and even test specimens can be prepared from it with great difficulties only.

The electric and mechanical properties of insulating materials described in Examples 1 to 6 are compiled in Table 1.

From the data of the Table it can be stated that the insulating materials of Examples 1 and 4 satisfy the requirements both electrically and mechancially and, at the same time, exhibit good resistance to the damage done by birds in outdoor use.

In the following, the equipment suitable for realizing the method of proposed by the invention is described in some detail with reference to the embodiment presented also in the attached drawings.

| Property | Standard Specification | Unit | Examples | | | | | |
|---|---|---|---|---|---|---|---|---|
| | | | 1 | 2 | 3 | 4 | 5 | 6 |
| Electric strength | DIN 53 481 | kV/mm | 23 | 23 | 21 | 24 | 21 | 19 |
| Creepage strength | DIN 53 480 | grade | KA3C | KA3C | KA3C | KA3C | KA3C | KA3C |
| Resistance to electric erosion | Work standard | hours | 697 | 532 | 479 | 791 | 683 | — |
| Arc resistance | ASTM D 495-61 | s | 230–240 | 210–220 | 195–215 | 230–240 | 195–215 | 140–150 |
| Tensile strength | DIN 53 504 | N/mm$^2$ | 5.5 | 5.4 | 5 | 5.3 | 5.2 | 4.0 |
| Elongation at rupture | DIN 53 504 | % | 120 | 120 | 90 | 70 | 90 | 50 |
| Tear propagation resistance | ASTM D 624 | N/mm | 8.5 | 7.8 | 7.5 | 8.0 | 8.2 | 6.1 |
| Hardness | DIN 53 505 | shore A | 50 | 50 | 47 | 52 | 50 | 73 |
| Combustibility/O$_2$-index/ | ASTM D 2863 | % | 29.3 | 26.2 | 26.3 | 33.7 | 26.6 | 29.6 |

In FIG. 1 the pneumatically operated feeder pumps 1, 3 and 11 are shown that can be mounted simply to the top of the storage tanks of the two-component liquid silicone elastomer compound. The vinyl-functional polysiloxane supplied by pump 1, the hydrogen-functional polysiloxane supplied by pump 2 and the ultramarine supplied by pump 11 are fed into mixing unit 2 at room temperature. Said pumps are preset to deliver the components in required proportions. The components homogenized in mixing unit 2 are led through casting head 5 and pipe line 6 into tank 7. Jacket 4 serves for keeping below $-5°$ C. the temperature of the parts polluted by the silicone elastomer compound by circulating a suitable coolant while the equipment is out of service, without causing excessive increase of viscosity of said compound, so that it can be processed again even after two months.

Figure 2:
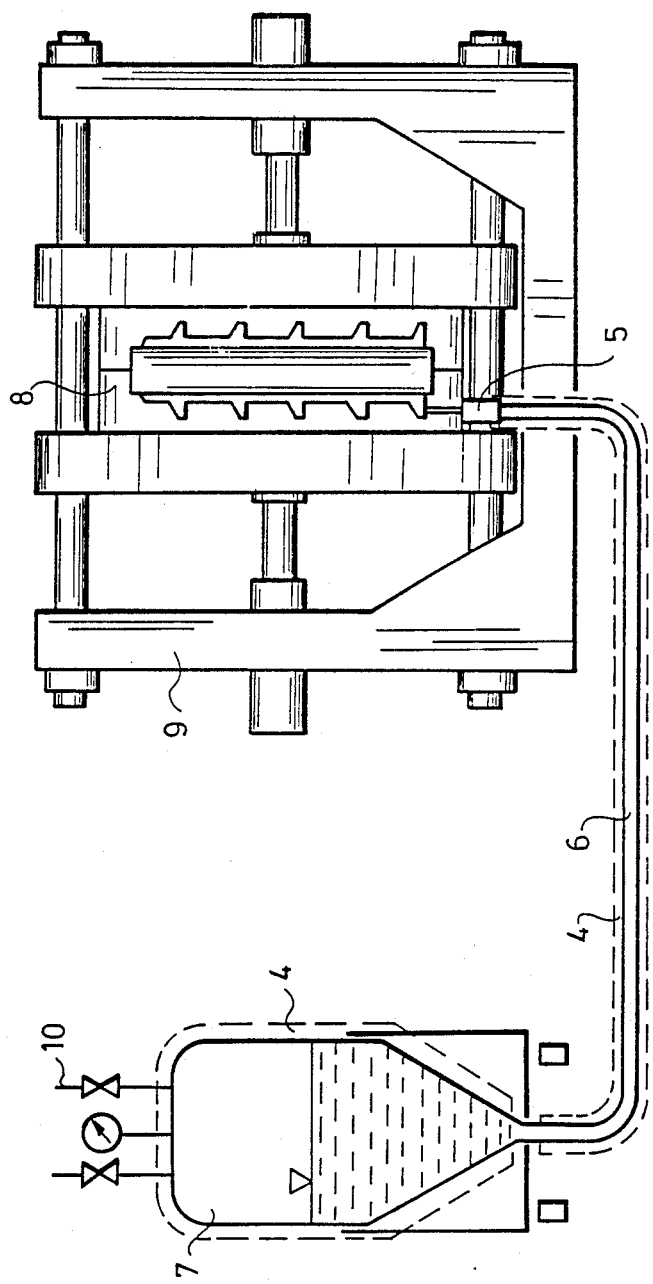
In FIG. 2 the simplified drawing of the feeding pressure tank integrally built with the mould and with the unit closing up the mould is shown In the following first, the production of the insulating material complying with the invention is described with reference to some examples.

FIG. 2 shows the actual process of mould casting. After having closed mould 8 with the help of opening-closing mechanism 9, the silicone elastomer mixture fed into tank 7 at room temperature is transferred through pipe line 6 and casting head 5 into the heated mould 8, while through stub 10 arranged at the top of tank 7 compressed air is led into tank 7. The silicone elastomer compound while streaming from below upwards into mould 8 fills up mould 8, and expels the air from said mould, then, under the effect of heat, the compound acquires its cross-linked structure. The Pressure of 5 to 6 bar brought about in tank 7 is maintained until the process of cross-linkage of the silicone elastomer compound is completed. After the elapse of time required for complete cross-linkage of the compound, depending on the wall thickness and main geometrical dimensions of the moulding, mould 8 is opened by hydraulically operated opening-closing mechanism 9, whereafter the finished moulded piece can be taken out of the mould. The silicone elastomer insulator body having acquired its cross-linked structure requires no further post-heat treatment.

We claim:

1. Apparatus for producing a silicone elastomer based insulating material and manufacturing from said material an outdoor insulator having a fiber-reinforced core and provided with sheds to increase the length of the electric creepage path, comprising:
    (a) pumping means supplying the individual components to be combined in a predetermined ratio, said components including a vinyl-functional polysiloxane, an H-functional polysiloxane and 0.1 to 10 percent by weight of a sulfur containing feldspathoid aluminum silicate;
    (b) first connecting means coupled to the outputs of said pumping means to convey said components;
    (c) mixing means to which said components are conveyed via said connecting means;
    (d) outlet means from said mixing means, allowing said components to leave said mixing means after forming a silicone elastomer mixture;
    (e) second connecting means, including a detachable casting head for accommodating said silicone elastomer mixture leaving said mixing means;
    (f) storage means for receiving said silicone elastomer mixture from said second connecting means said second connecting means being located in the bottom of said storage means and connectable with said mixing means and mold means;
    (g) mold means having a generally vertical longitudinal axis for receiving a fiber core and molding an insulator about said fiber core and having bottom located means for receiving molding material from said storage means;
    (h) pressure means, exerting 5 to 6 bar, for moving said silicone elastomer mixture, from said storage means through the second connecting means into said molding means through said casting head attached to a single input; and
    (i) heating means associated with said molding means for causing a cross-linked structure to be achieved in said silicone elastomer mixture in said molding means.

2. Apparatus as in claim 1, wherein a means for cooling structural parts, excluding the mold, containing said silicone elastomer mixture to at least 0° C. when said elastomer mixture is present is provided.

3. Apparatus as in claim 1, wherein said molding means is split and openable along its longitudinal axis.

4. Apparatus as in claim 1, wherein said storage means is of a volume greater than the capacity of the mold.

5. Apparatus as in claim 1, wherein said storage means has an inlet at the top suitable for the admission of compressed air as said means for moving said silicone elastomer mixture.

* * * * *